US007925888B1

(12) United States Patent
Nachenberg

(10) Patent No.: US 7,925,888 B1
(45) Date of Patent: *Apr. 12, 2011

(54) DATA DRIVEN DETECTION OF VIRUSES

(75) Inventor: Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1724 days.

This patent is subject to a terminal disclaimer.

(21) Appl. No.: 10/995,693

(22) Filed: Nov. 22, 2004

Related U.S. Application Data

(63) Continuation of application No. 09/451,632, filed on Nov. 30, 1999, now Pat. No. 6,851,057.

(51) Int. Cl.
*G06F 11/30* (2006.01)

(52) U.S. Cl. .......... 713/188; 713/187; 713/190; 726/23; 726/24

(58) Field of Classification Search ............ 726/22, 726/23, 24; 713/187, 188, 190; 703/26; 717/134
See application file for complete search history.

(56) References Cited

U.S. PATENT DOCUMENTS
5,386,523 A 1/1995 Crook et al.
(Continued)

FOREIGN PATENT DOCUMENTS
WO WO 97/12322 * 3/1997

OTHER PUBLICATIONS

Padawer, "Microsoft P-Code Technology," [online]. Apr. 1992 [retrieved on Nov. 13, 2003]. Retrieved from the Internet: <URL: http://msdn.Microsoft.com/archive/en-us/dnarvc/html/msdn_c7pcode2.asp?frame=true.>, 6 pages.

(Continued)

*Primary Examiner* — Michael Pyzocha
*Assistant Examiner* — Paul Callahan
(74) *Attorney, Agent, or Firm* — Fenwick & West LLP

(57) ABSTRACT

A virus detection system (VDS) (400) operates under the control of P-code to detect the presence of a virus in a file (100) having multiple entry points. P-code is an intermediate instruction format that uses primitives to perform certain functions related to the file (100). The VDS (400) executes the P-code, which provides Turing-equivalent capability to the VDS. The VDS (400) has a P-code data file (410) for holding the P-code, a virus definition file (VDF) (412) for holding signatures of known viruses, and an engine (414) for controlling the VDS. The engine (414) contains a P-code interpreter (418) for interpreting the P-code, a scanning module (424) for scanning regions of the file (100) for the virus signatures in the VDF (412), and an emulating module (426) for emulating entry points of the file. When executed, the P-code examines the file (100), posts (514) regions that may be infected by a virus for scanning, and posts (518) entry points that may be infected by a virus for emulating. The P-code can also detect (520) certain viruses algorithmically. Then, the posted regions and entry points of the file (100) are scanned (526) and emulated (534) to determine if the file is infected with a virus. This technique allows the VDS (400) to perform sophisticated analysis of files having multiple entry points in a relatively brief amount of time. In addition, the functionality of the VDS (400) can be changed by changing the P-code, reducing the need for burdensome engine updates.

15 Claims, 5 Drawing Sheets

U.S. PATENT DOCUMENTS

| | | | | |
|---|---|---|---|---|
| 5,398,196 | A | * | 3/1995 | Chambers ................. 714/28 |
| 5,696,822 | A | | 12/1997 | Nachenberg |
| 5,796,989 | A | | 8/1998 | Morley et al. |
| 5,826,013 | A | | 10/1998 | Nachenberg |
| 5,842,002 | A | * | 11/1998 | Schnurer et al. ............ 703/21 |
| 5,854,916 | A | | 12/1998 | Nachenberg |
| 5,881,151 | A | | 3/1999 | Yamamoto |
| 5,960,170 | A | * | 9/1999 | Chen et al. ................. 714/38 |
| 5,964,889 | A | | 10/1999 | Nachenberg |
| 5,999,723 | A | | 12/1999 | Nachenberg |
| 6,021,510 | A | | 2/2000 | Nachenberg |
| 6,067,410 | A | | 5/2000 | Nachenberg |
| 6,088,803 | A | | 7/2000 | Tso et al. |
| 6,094,731 | A | | 7/2000 | Waldin et al. |
| 6,311,277 | B1 | | 10/2001 | Takaragi et al. |
| 6,357,008 | B1 | | 3/2002 | Nachenberg |

OTHER PUBLICATIONS

"Frequently Asked Questions on Virus-L/comp.virus," [online]. Oct. 9, 1995 [retrieved on Nov. 25, 2003]. Retrieved from the Internet: <URL: http://www.claws-and-paws.com/virus/faqs/vlfaq200.shtml>, 53 pages.

LeCharlier et al., "Dynamic Detection and Classification of Computer Viruses Using General Behavior Patterns," Proceedings of the Fifth International Virus Bulletin Conference, Boston, Mass., Sep. 20-22, 1995, 22 pages.

McCanne et al., "The BSD Packet Filter: A new Architecture for User-level Packet Capture," Preprint Dec. 19, 1992, 1993 Winter USENIX conference, San Diego, California, Jan. 25-29, 1993, 11 pages.

Leitold et al, "VIRus Searching and KILling Language." Proceedings of the Second International Virus Bulletin Conference, Sep. 1992, 15 pages.

Taubes, "An Immune System for Cyberspace," Think Research [online], vol. 34, No. 4, 1996 (retrieved on Dec. 15, 2003). Retrieved from the Internet: <URL: http://domino.research.ibm.com/comm./wwwr_thinkresearch.nsf/pages/antivirus496.html>, 9 pages.

Ször, "Memory Scanning Under Windows NT," Virus Bulletin Conference, Sep. 1999, 22 pages.

Ször, "Attacks on Win32," Virus Bulletin Conference, Oct. 1998, 84 pages.

Symantec, "Understanding Heuristics", Symantec's Bloodhound Technology, 1997, Symantec White Paper Series, vol. XXXIV.

Trend Mirco, Inc., "Eliminating Viruses in the Lotus Notes Environment", 1999, Trend Micro Product Paper.

Parkhouse, Jayne, "Pelican SafeTNet 2.0" [online], Jun. 2000. SC Magazine Product Review, [retrieved on Dec. 1, 2003]. Retrieved from the Internet: <URL: http://www.scmagazine.com/scmagazine/standalone/pelican/sc_pelican.html.

* cited by examiner

DATA DRIVEN DETECTION OF VIRUSES

CROSS-REFERENCE TO RELATED APPLICATIONS

This application is a continuation of prior application Ser. No. 09/451,632, now U.S. Pat. No. 6,851,057, filed Nov. 30, 1999, which is incorporated herein by reference.

BACKGROUND OF THE INVENTION

1. Field of the Invention

This invention pertains in general to detecting viruses within files in digital computers and more particularly to detecting the presence of a virus in a file having multiple entry points.

2. Background of the Invention

Simple computer viruses work by copying exact duplicates of themselves to each executable program file they infect. When an infected program executes, the simple virus gains control of the computer and attempts to infect other files. If the virus locates a target executable file for infection, it copies itself byte-for-byte to the target executable file. Because this type of virus replicates an identical copy of itself each time it infects a new file, the simple virus can be easily detected by searching in files for a specific string of bytes (i.e. a "signature") that has been extracted from the virus.

Encrypted viruses comprise a decryption routine (also known as a decryption loop) and an encrypted viral body. When a program file infected with an encrypted virus executes, the decryption routine gains control of the computer and decrypts the encrypted viral body. The decryption routine then transfers control to the decrypted viral body, which is capable of spreading the virus. The virus is spread by copying the identical decryption routine and the encrypted viral body to the target executable file. Although the viral body is encrypted and thus hidden from view, these viruses can be detected by searching for a signature from the unchanging decryption routine.

Polymorphic encrypted viruses ("polymorphic viruses") comprise a decryption routine and an encrypted viral body which includes a static viral body and a machine-code generator often referred to as a "mutation engine." The operation of a polymorphic virus is similar to the operation of an encrypted virus, except that the polymorphic virus generates a new decryption routine each time it infects a file. Many polymorphic viruses use decryption routines that are functionally the same for all infected files, but have different sequences of instructions.

These multifarious mutations allow each decryption routine to have a different signature. Therefore, polymorphic viruses cannot be detected by simply searching for a signature from a decryption routine. Instead, antivirus software uses emulator-based antivirus technology, also known as Generic Decryption (GD) technology, to detect the virus. The GD scanner works by loading the program into a software-based CPU emulator which acts as a simulated virtual computer. The program is allowed to execute freely within this virtual computer. If the program does in fact contain a polymorphic virus, the decryption routine is allowed to decrypt the viral body. The GD scanner can then detect the virus by searching through the virtual memory of the virtual computer for a signature from the decrypted viral body.

Metamorphic viruses are not encrypted but vary the instructions in the viral body with each infection of a host file. Accordingly, metamorphic viruses often cannot be detected with a string search because they do not have static strings.

Regardless of whether the virus is simple, encrypted, polymorphic, or metamorphic, the virus typically infects an executable file by attaching or altering code at or near an "entry point" of the file. An "entry point" is an instruction or instructions in the file that a virus can modify to gain control of the computer system on which the file is being executed. Many executable files have a "main entry point" containing instructions that are always executed when the program is invoked. Accordingly, a virus seizes control of the program by manipulating program instructions at the main entry point to call the virus instead of the program. The virus then infects other files on the computer system.

When infecting a file, the virus typically stores the viral body at the main entry point, at the end of the program file, or at some other convenient location in the file. When the virus completes execution, it calls the original program instructions that were altered by the virus.

In order to detect the presence of a virus, antivirus software typically scans the code near the main entry point, and other places where the viral body is likely to reside, for strings matching signatures held in a viral signature database. In addition, the antivirus software emulates the code near the main entry point in an effort to decrypt any encrypted viral bodies. Since viruses usually infect only the main entry point, the antivirus software can scan and emulate a file relatively quickly. When new viruses are detected, the antivirus software can be updated by adding the new viral signatures to the viral signature database.

More recently, however, viruses have been introduced that infect entry points other than the main entry point. As a result, the number of potential entry points for a viral infection in a typical search space, such as a MICROSOFT WINDOWS portable executable (PE) file, is very large. Prior art antivirus software would require an extremely long processing time to scan and/or emulate the code surrounding all of the entry points in the file that might be infected by a virus.

Moreover, the multiple entry points provide opportunities for viruses to use previously unknown methods to infect a file. As a result, it may not be possible to detect the virus merely by adding a new signature to the viral signature database. In many cases, the virus detection system itself must be updated with hand-coded virus detection routines in order to detect the new viruses. Writing custom detection routines and updating the antivirus software-requires a considerable amount of work, especially when the antivirus software is distributed to a mass market.

Therefore, there is a need in the art for antivirus software that can detect viruses in PE and other files having multiple entry points without requiring a prohibitively large amount of processing time. There is also a need that the antivirus software be easily upgradeable, so that new virus detection capabilities can be added without requiring hand-coded virus detection logic or needing to distribute a new virus detection engine.

SUMMARY OF THE INVENTION

The above needs are met by a virus detection system (VDS) (400) for detecting the presence of a virus in a file (100) having multiple entry points. The VDS (400) preferably includes a data file (410) holding P-code instructions. P-code is an interpreted language that provides the VDS (400) with Turing machine-equivalent behavior, and allows the VDS to be updated by merely updating the P-code. The VDS (400) also includes a virus definition file (VDF) (412) containing virus signatures for known viruses. Each virus signature is a string of bytes characteristic of the static viral body of the given virus.

The VDS (400) is controlled by an engine (414) having a P-code interpreter (418) for interpreting the P-code in the data file (410). The P-code interpreter (418) may also contain primitives (420) that can be invoked by the P-code. Primitives are functions that can be called by the P-code. The primitives (420) preferably perform file and memory manipulations, and can also perform other useful tasks. In addition, the engine (414) has a scanning module (424) for scanning a file or range of memory for virus signatures in the VDF (412) and an emulating module (426) for emulating code in the file (100) in order to decrypt polymorphic viruses and detect the presence of metamorphic viruses.

The engine (414) interprets the P-code in the P-code data file (410) and responds accordingly. In one embodiment, the P-code examines the entry points in the file (100) to determine whether the entry points might be infected with a virus. Those entry points and other regions of the file (100) commonly infected by viruses or identified by suspicious characteristics in the file, such as markers left by certain viruses, are posted (514) for scanning. Likewise, the P-code posts (518) entry points and starting contexts for regions of the file (100) that are commonly infected by viruses or bear suspicious characteristics for emulating. Using the P-code to preprocess regions of the file (100) and select only those regions or entry points that are likely to contain a virus for subsequent scanning and/or emulating allows the VDS (400) to examine files for viruses that infect places other than the main entry point in a reasonable amount of time. The P-code can also determine whether the file (100) is infected with a virus by using virus detection routines written directly into the P-code, thereby eliminating the need to scan for strings or emulate the file (100).

A region posted for string scanning is identified by a range of memory addresses. Preferably, the P-code merges postings having overlapping ranges so that a single posting specifies the entire region to be scanned. When an entry point is posted for emulating, the P-code specifies the emulation context, or starting state to be used for the emulation. An entry point can be posted multiple times with different contexts for each emulation. The engine (414) uses the scanning module (424) to scan the regions of the file (100) that are posted for scanning by the P-code for the virus signatures in the VDF (412). If the scanning module (424) detects a virus, the VDS (400) preferably reports that the file (100) is infected and stops operation.

If the scanning module (424) does not find a virus in the posted regions, a preferred embodiment of the present invention optionally utilizes a hook to call (530) custom virus detection code. The hook allows virus detection engineers to insert a custom program into the VDS (400) and detect viruses that, for reasons of speed and efficiency, are better detected by custom code.

Then, the VDS (400) preferably uses the emulating module (426) to emulate the posted entry points. Preferably, each posted entry point is emulated for enough instructions to allow polymorphic and metamorphic viruses to decrypt or otherwise become apparent. Once emulation is complete, the VDS (400) uses the scanning module (424) to scan pages of the virtual memory (434) that were either modified or emulated through for signatures of polymorphic viruses and uses stochastic information obtained during the emulation, such as instruction usage profiles, to detect metamorphic viruses. If the scanning module (424) or VDS (400) detects a virus, the VDS reports that the file (100) is infected. Otherwise, the VDS (400) reports that it did not detect a virus in the file (100).

DETAILED DESCRIPTION OF THE PREFERRED EMBODIMENTS

In order to accomplish the mischief for which they are designed, software viruses must gain control of a computer's central processing unit (CPU). Viruses typically gain this control by attaching themselves to an executable file (the "host file") and modifying the executable image of the host file at an entry point to pass control of the CPU to the viral code. The virus conceals its presence by passing control back to the host file after it has run by calling the original instructions at the modified entry point.

Viruses use different techniques to infect the host file. For example, a simple virus always inserts the same viral body into the target file. An encrypted virus infects a file by inserting an unchanging decryption routine and an encrypted viral body into the target file. A polymorphic encrypted virus (a "polymorphic virus") is similar to an encrypted virus, except that a polymorphic virus generates a new decryption routine each time it infects a file. A metamorphic virus is not encrypted, but it reorders the instructions in the viral body into a functionally equivalent, but different, virus each time it infects a file. Simple and encrypted viruses can typically be detected by scanning for strings in the viral body or encryption engine, respectively. Since polymorphic and metamorphic viruses usually do not have static signature strings, polymorphic and metamorphic viruses can typically be detected by emulating the virus until either the static viral body is decrypted or the virus otherwise becomes apparent. While this description refers to simple, encrypted, polymorphic, and metamorphic viruses, it should be understood that the present invention can be used to detect any type of virus, regardless of whether the virus fits into one of the categories described above.

A virus typically infects an executable file by attaching or altering code at or near an entry point of the file. An "entry point" is any instruction or instructions in the file that a virus can modify to gain control of the computer system on which the file is being executed. An entry point is typically identified by an offset from some arbitrary point in the file. Certain entry points are located at the beginning of a file or region and, thus, are always invoked when the file or region is executed. For example, an entry point can be the first instruction executed when a file is executed or a function within the file is called. Other entry points may consist of single instructions deep within a file that can be modified by a virus. For example, the entry point can be a CALL or JMP instruction that is modified to invoke viral code. Once a virus seizes control of the computer system through the entry point, the virus typically infects other files on the system.

Figure 1:
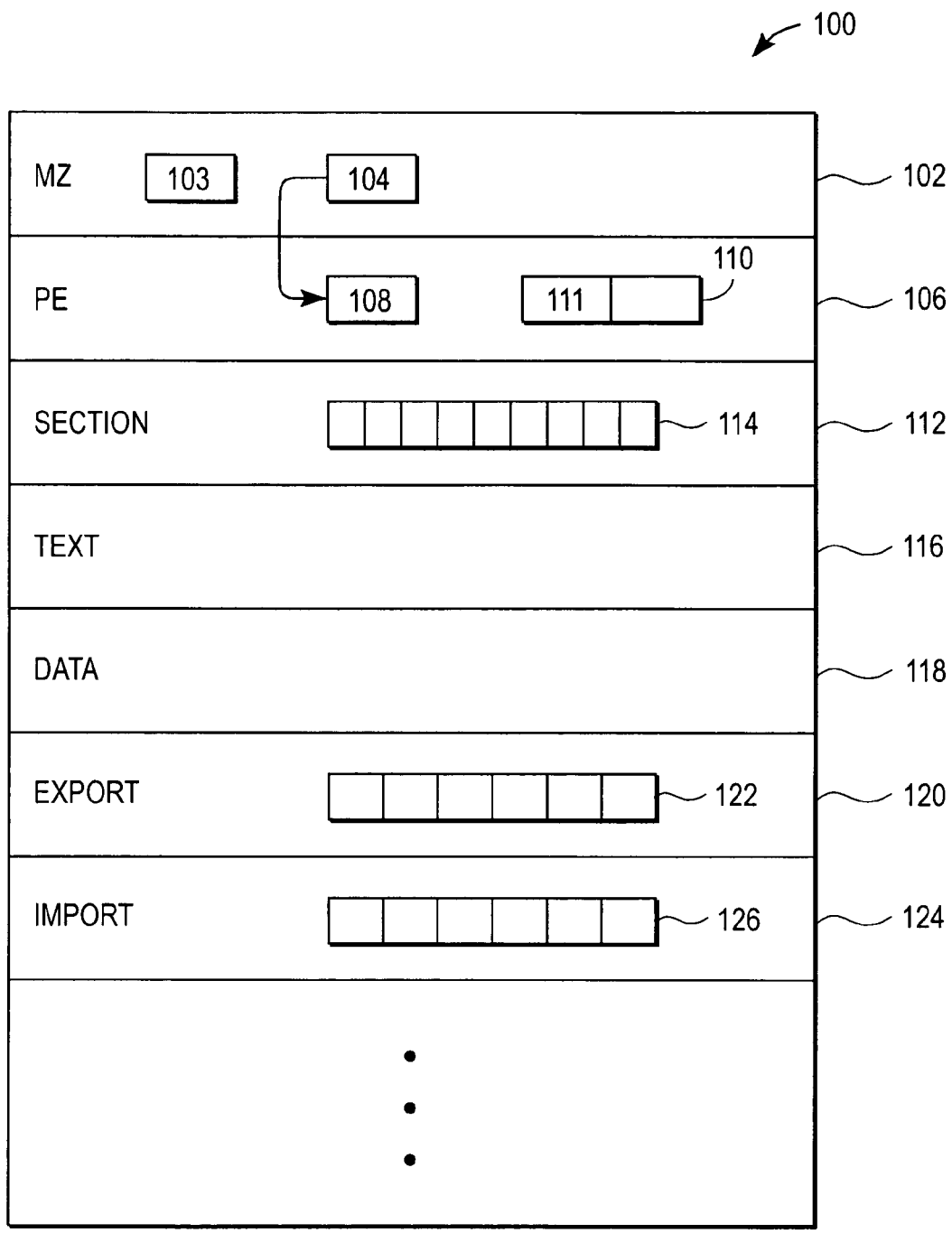
FIG. 1 is a high-level block diagram of an executable file 100 having multiple entry points that can be infected by a virus.

FIG. 1 is a high-level block diagram of an executable file 100 having multiple entry points that can be infected by a virus as described above. In the example illustrated by FIG. 1, the executable file is a Win32 portable executable (PE) file intended for use with a MICROSOFT WINDOWS-based operating system (OS), such as WINDOWS 98, WINDOWS NT, and WINDOWS 2000. Typically, the illustrated file 100 is of the type .EXE, indicating that the file is an executable file, or .DLL, indicating that the file is a dynamic link library (DLL). However, the present invention can be used with any file, and is not limited to only the type of file illustrated in FIG. 1. APPLE MACINTOSH files, for example, share many similarities with Win32 files, and the present invention is equally applicable to such files.

The file 100 is divided into sections containing either code or data and aligned along four kilobyte (KB) boundaries. The MS-DOS section 102 contains the MS-DOS header 102 and is marked by the characters "MZ". This section 102 contains a small executable program 103 designed to display an error message if the executable file is run in an unsupported OS (e.g., MS-DOS). This program 103 is an entry point for the file 100. The MS-DOS section 102 also contains a field 104 holding the relative offset to the start 108 of the PE section 106. This field 104 is another entry point for the file 100.

The PE section 106 is marked by the characters "PE" and holds a data structure 110 containing basic information about the file 100. The data structure 110 holds many data fields describing various aspects of the file 100. One such field is the "checksum" field 111, which is rarely used by the OS.

The next section 112 holds the section table 114. The section table 114 contains information about each section in the file 100, including the section's type, size, and location in the file 100. For example, entries in the section table 114 indicate whether a section holds code or data, and whether the section is readable, writeable, and/or executable. Each entry in the section table 114 describes a section that may have multiple, one, or no entry points.

The text section 116 holds general-purpose code produced by the compiler or assembler. The data section 118 holds global and static variables that are initialized at compile time.

The export section 120 contains an export table 122 that identifies functions exported by the file 100 for use by other programs. An EXE file might not export any functions but DLL files typically export some functions. The export table 122 holds the function names, entry point addresses, and export ordinal values for the exported functions. The entry point addresses typically point to other sections in the file 100. Each exported function listed in the export table 122 is an entry point into the file 100.

The import section 124 has an import table 126 that identifies functions that are imported by the file 100. Each entry in the import table 126 identifies the external DLL and the imported function by name. When code in the text section 116 calls a function in another module, such as an external DLL file, the call instruction transfers control to a JMP instruction also in the text section 116. The JMP instruction, in turn, directs the call to a location within the import table 126. Both the JMP instruction and the entries in the import table 126 represent entry points into the file 100. Additional information about the Win32 file format is found in M. Pietrek, "Peering Inside the PE: A Tour of the Win32 Portable Executable File Format," Microsoft Systems Journal, March 1994, which is hereby incorporated by reference.

Figure 2:
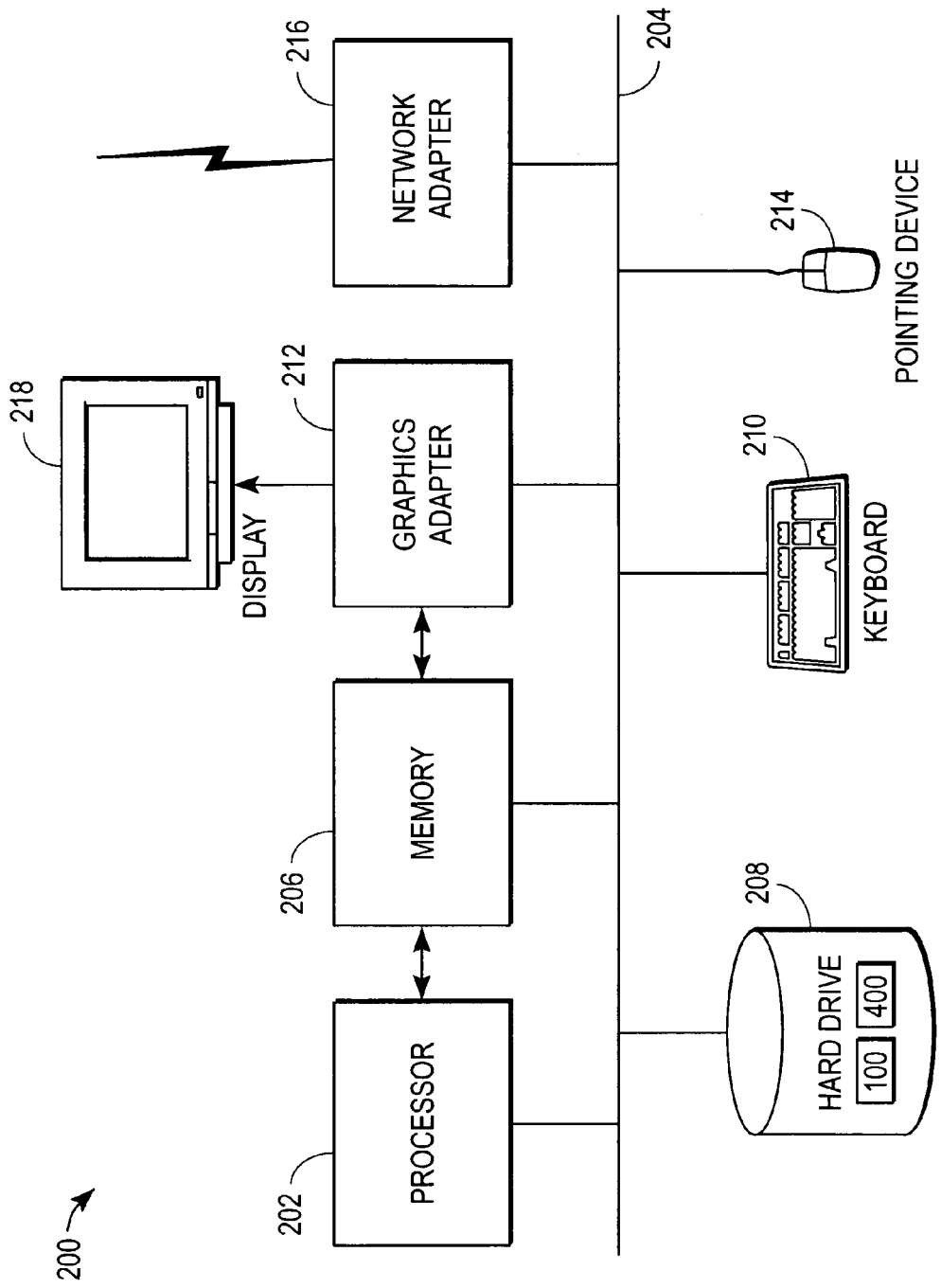
FIG. 2 is a high-level block diagram of a computer system 200 for storing and executing the file 100 and a virus detection system (VDS) 400.

FIG. 2 is a high-level block diagram of a computer system 200 for storing and executing the host file 100 and a virus detection system (VDS) 400. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The at least one processor 202 may be any general-purpose processor such as an INTEL x86, SUN MICROSYSTEMS SPARC, or POWERPC compatible-CPU. The storage device 208 may be any device capable of holding data, like a hard drive, compact disk read-only memory (CD-ROM), DVD, or a solid-state memory device. The memory 206 holds instructions and data used by the processor 202. The pointing device 214 may be a mouse, track ball, light pen, touch-sensitive display, or other type of pointing device, and is used in combination with the keyboard 210 to input data into the computer system 200. The graphics adapter 212 displays images and other information on the display 218. The network adapter 216 couples the computer system 200 to a local or wide area network.

Preferably, the host file 100 and program modules providing the functionality of the VDS 400 are stored on the storage device 208. The program modules, according to one embodiment, are loaded into the memory 206 and executed by the processor 202. Alternatively, hardware or software modules for providing the functionality of the VDS 400 may be stored elsewhere within the computer system 200.

Figure 3:
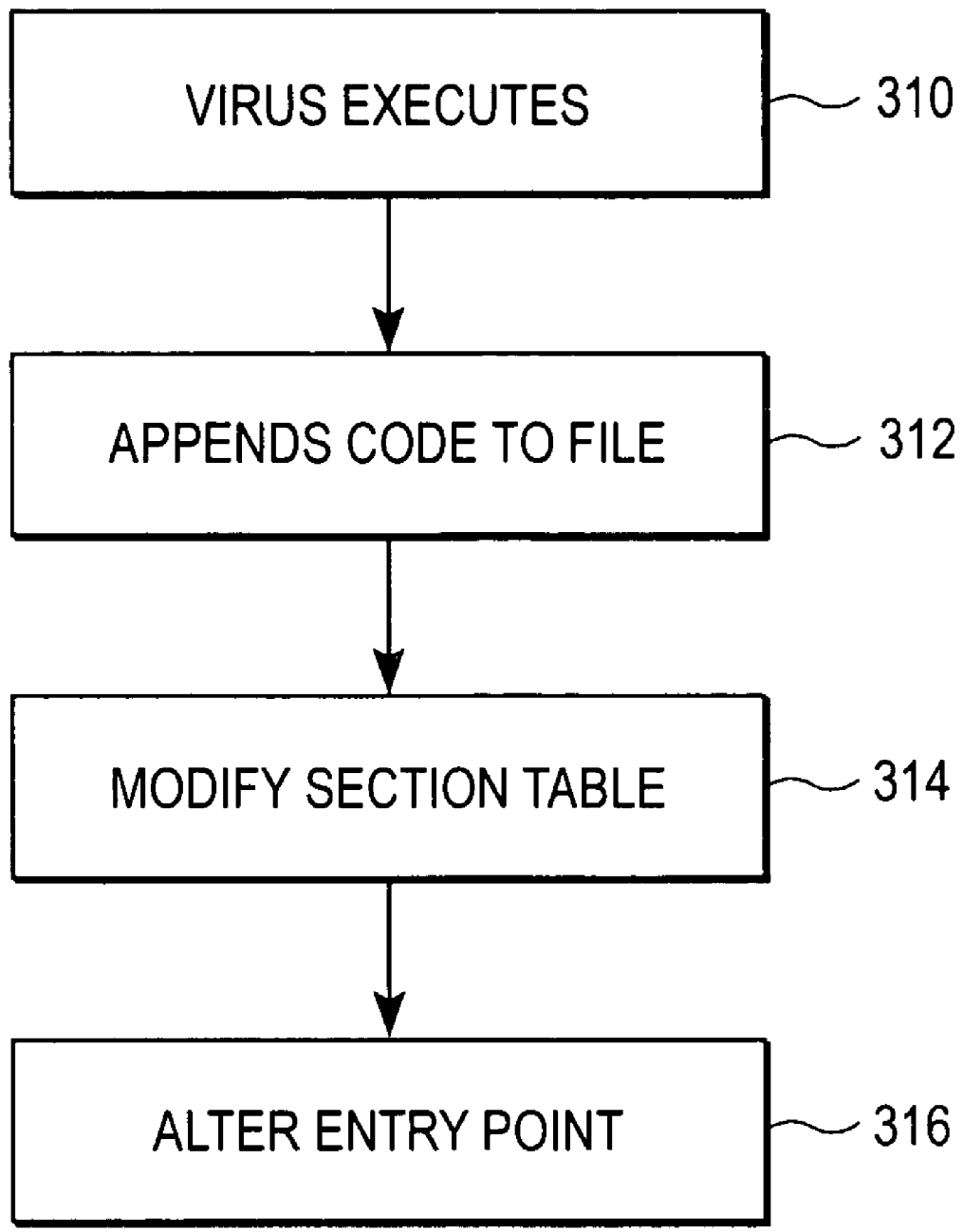
FIG. 3 is a flow chart illustrating steps performed by a typical virus when infecting the file 100.

FIG. 3 is a flow chart illustrating steps performed by a typical virus when infecting the host file 100. The illustrated steps are merely an example of a viral infection and are not representative of any particular virus. Initially, the virus executes 310 on the computer system 200. The virus may execute, for example, when the computer system 200 executes or calls a function in a previously-infected file.

When the host file 100 is opened, the virus appends 312 the viral code to a location within the file. For example, the virus can append the viral body to the slack space at the end of a section or put the viral body within an entirely new section. The virus can be, for example, simple, encrypted, polymorphic, or metamorphic.

The virus also modifies 314 the section table 114 to account for the added viral code. For example, the virus may change the size entry in the section table 114 to account for the added viral code. Likewise, the virus may add entries for new sections added by the virus. If necessary, the virus may mark an infected section as executable and/or place a value in a little used field, such as the checksum field 111, to discreetly mark the file as infected and prevent the virus from reinfecting the file 100.

In addition, the virus alters 316 an entry point of the file 100 to call the viral code. The virus may accomplish this step by, for example, overwriting the value in the field 104 holding the relative offset to the start 108 of the PE section 106 with the relative offset to virus code stored elsewhere in the file. Alternatively, the virus can modify entries in the export table 122 to point to sections of virus code instead of the exported functions. A virus can also modify the destination of an existing JMP or CALL instruction anywhere in the file 100 to point to the location of viral code elsewhere in the file, effectively turning the modified instruction into a new entry point for the virus.

Figure 4:
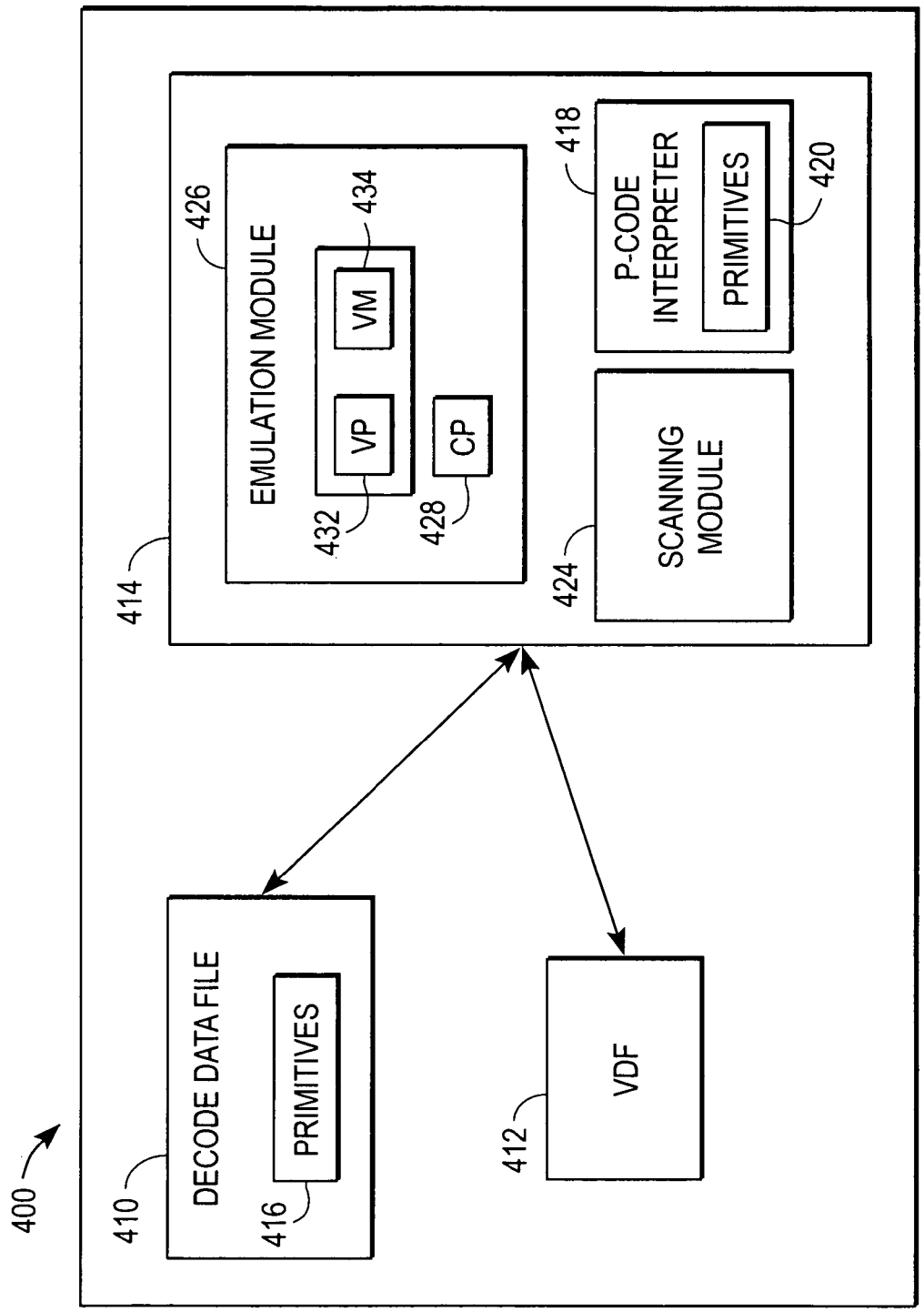
FIG. 4 is a high-level block diagram of the VDS 400 according to a preferred embodiment of the present invention.

FIG. 4 is a high-level block diagram of the VDS 400 according to a preferred embodiment of the present invention. The VDS 400 includes a P-code data file 410, a virus definition file (VDF) 412, and an engine 414. The P-code data file 410 holds P-code instructions for examining the host file 100.

As used herein, "P-code" refers to program code instructions in an interpreted computer language. The P-code provides a Turing-equivalent programmable system which has all of the power of a program written in a more familiar language, such as C. Preferably, the P-code instructions in the data file 410 are created by writing instructions in any computer language and then compiling the instructions into P-code. Other portable, i.e., cross-platform, languages or instruction representations, such as JAVA, may be used as well.

The VDF 412 preferably holds an entry or virus definition for each known virus. Each virus definition contains information specific to a virus or strain of viruses, including a signature for identifying the virus or strain. An entry in the VDF 412, according to an embodiment of the present invention, is organized as follows:

[VirusID]
0x2f41
[SigStart]
0x89, 0xb4, 0xb8, 0x02, 0x096, 0x56, DONE
[SigEnd]

Here, [VirusID] is a data field for a number that identifies the specific virus or virus strain. [SigStart] and [SigEnd] bracket a virus signature, which is a string of bytes characteristic of the virus or strain having Virus ID 0x2f41. The signature, for example, may identify the static encryption engine of an encrypted virus or the static viral body of a polymorphic virus. The virus signatures are used to detect the presence of a virus in a file (or in the virtual memory 434 after emulating), typically by performing a string scan for the bytes in the signature. In one embodiment of the present invention, the VDF 412 holds virus definitions for thousands of viruses.

The engine 414 controls the operation of the VDS 400. The engine 414 preferably contains a P-code interpreter 418 for interpreting the P-code in the P-code data file 410. The interpreted P-code controls the operation of the engine 414. In alternative embodiments where the data file 410 holds instructions in a format other than P-code, the engine 414 is equipped with a module for interpreting or compiling the instructions in the relevant format. For example, if the data file 410 holds JAVA instructions, the engine 414 preferably includes a JAVA Just-in-Time compiler.

The P-code interpreter 418 preferably includes special P-code function calls called "primitives" 420. The primitives 420 can be, for example, written in P-code or a native language, and/or integrated into the interpreter itself. Primitives 420 are essentially functions useful for examining the host file 100 and the virtual memory 434 that can be called by other P-code. For example, the primitives 420 perform functions such as opening files for reading, closing files, zeroing out memory locations, truncating memory locations, locating exports in the file, determining the type of the file, and finding the offset of the start of a function. The functions performed by the primitives 420 can vary depending upon the computer or operating system in which the VDS 400 is being used. For example, different primitives may be utilized in a computer system running the MACINTOSH operating system than in a computer system running a version of the WINDOWS operating system. In an alternative embodiment, some or all of the primitives can be stored in the P-code data file 410 instead of the interpreter 418.

The engine 414 also contains a scanning module 424 for scanning pages of the virtual memory 434 or regions of a file 100 for virus signatures held in the VDF 412. In one embodiment, the scanning module 424 receives a range of memory addresses as parameters. The scanning module scans the memory addresses within the supplied range for signatures held in the VDF 412.

The engine 414 also contains an emulating module 426 for emulating code in the file 100 starting at an entry point. The emulating module includes a control program 428 for setting up a virtual machine 430 having a virtual processor 432 and an associated virtual memory 434. The virtual machine can emulate a 32-bit MICROSOFT WINDOWS environment, an APPLE MACINTOSH environment, or any other environment for which emulation is desired. The virtual machine 430 uses the virtual processor 432 to execute code in the virtual memory 434 in isolation from the remainder of the computer system 200. Emulation starts with a given context, which specifies the contents of the registers, stacks, etc. in the virtual processor 432. During emulation, every page of virtual memory 434 that is read from, written to, or emulated through is marked. The number of instructions that the virtual machine 430 emulates can be fixed at the beginning of emulation or can be determined adaptively while the emulation occurs.

Figure 5:
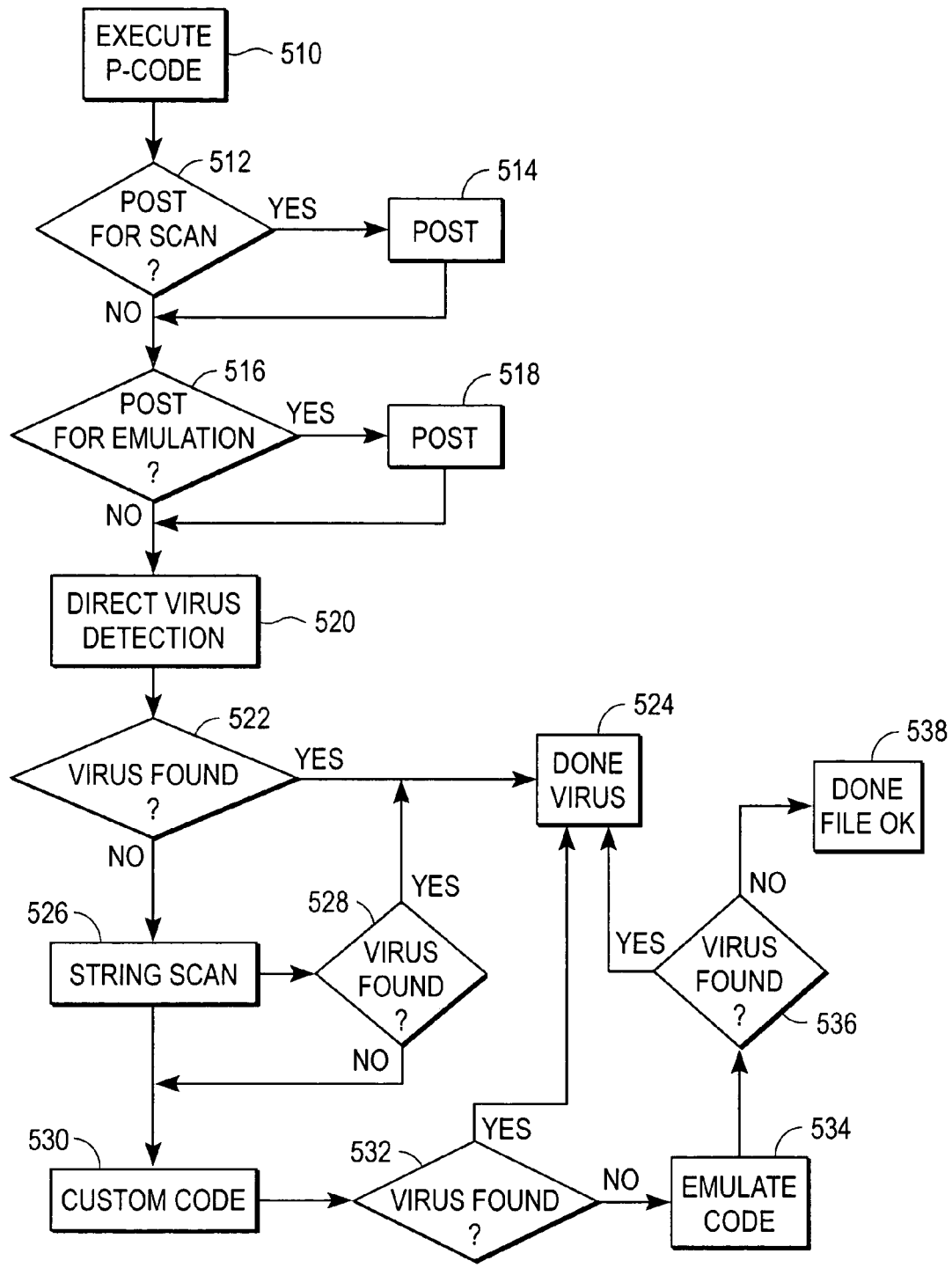
FIG. 5 is a flow chart illustrating steps performed by the VDS 400 according to a preferred embodiment of the present invention.

FIG. 5 is a flow chart illustrating steps performed by the VDS 400 according to a preferred embodiment of the present invention. The behavior of the VDS 400 is controlled by the P-code. Since the P-code provides Turing machine-like functionality to the VDS 400, the VDS 400 has an infinite set of possible behaviors. Accordingly, it should be understood that the steps illustrated in FIG. 5 represent only one possible set of VDS 400 behaviors.

Initially, the engine 414 executes 510 the P-code in the P-code data file 410. Next, the P-code determines 512 which areas of the file 100 should be scanned for virus strings because the areas are likely to contain a simple or encrypted virus. Areas of the file 100 that should be scanned are posted 514 for later scanning. Typically, the main entry point of the PE header and the last section of the file 100 are always posted 514 for string scanning because these are the areas most likely to be infected by a virus. Any other region of the file can be posted 514 for scanning if the regions seem suspicious. For example, if the destination of a JMP or CALL instruction points to a suspicious location in the file 100, it may be desirable to post the areas of the file surrounding both the instruction and the destination.

For other regions of the file 100, the determination of whether to scan is made based on tell-tale markers set by the viruses, such as unusual locations and lengths of sections, or unusual attribute settings of fields within the sections. For example, if the value of an unused field, such as the checksum field 111, is set or the length of a section is suspiciously long, then the P-code posts 514 a region of the section for scanning. Likewise, if a section that is normally not executable is marked as executable, then the P-code preferably posts 514 a region of the section for scanning.

Next, the P-code determines 516 which entry points should be posted 518 for emulating because the entry points are likely to execute polymorphic or metamorphic viruses. The P-code checks the main entry point 103 for known non-viral code. If such code is not found, then the P-code posts the main entry point 103 for emulating. Entry points in other regions of the file 100 are posted 518 for emulating if the code exhibits evidence of viral infection. For example, an entry point in a region of the file 100 is preferably posted for emulating if the checksum field 111 in the header contains a suspicious value. When an entry point is posted for emulating, an emulation context, or starting state of the computer system 200, is also specified.

The P-code can also identify 520 viruses in the file 100 without emulating or string searching. This identification is performed algorithmically or stochastically using virus definitions written into the P-code. The virus definitions preferably use the primitives 420 in the interpreter 418 to directly test the file 100 for characteristics of known viruses. For example, if the last five bytes of a file or section have a certain signature found in only one virus, or the file size is evenly divisible by 10, characteristics likely to occur only if the file is infected by certain viruses, then the P-code can directly detect the presence of the virus. In addition, the P-code can be enhanced with algorithms and heuristics to detect the behavior of unknown viruses. If a virus is found 522 by the P-code, the VDS 400 can stop 524 searching and report that the file 100 is infected with a virus.

Scan requests posted by the P-code are preferably merged and minimized to reduce redundant scanning. For instance, a posted request to scan bytes 1000 to 1500, and another posted request to scan bytes 1200 to 3000, are preferably merged into a single request to scan bytes 1000 to 3000. Any merging algorithm known to those skilled in the art can be used to merge the scan requests. Posted emulating requests having identical contexts can also be merged, although such posts occur less frequently than do overlapping scan requests.

If the P-code does not directly detect 522 a virus, the VDS 400 next preferably performs scans on the posted regions of the file 100. The VDS 400 executes 526 the scanning module 424 to scan the posted regions for the virus signatures of simple and encrypted viruses found in the VDF 412. If a virus is found 528 by the scanning module 424, the VDS 400 stops scanning 524 and reports that the file 100 is infected with a virus.

If neither the P-code nor the scanning module 424 detects the presence of a virus; the VDS 400 preferably utilizes a hook to execute 530 custom virus-detection code. The hook allows virus detection engineers to insert custom virus detection routines written in C, C++, or any other language into the VDS 400. The custom detection routines may be useful to detect unique viruses that are not practical to detect via the P-code and string scanning. For example, it may be desired to use faster native code to detect a certain virus rather than the slower P-code. Alternate embodiments of the present invention may provide hooks to custom code at other locations in the program flow. If a virus is found 532 by the custom code, the VDS 400 can stop searching 524 for a virus and report that the file 100 is infected.

If the P-code, scanning module 424, and custom code fail to detect a virus, the VDS 400 preferably executes the emulating module 426. The emulating module 426 emulates 534 the code at the entry point posted by the P-code in order to decrypt polymorphic viruses and trace through code to locate metamorphic viruses. Once enough instructions have been emulated that any virus should become apparent (i.e., a polymorphic virus has decrypted the static viral body or the code of a metamorphic virus is recognized), the emulating module 426 preferably detects a polymorphic virus by using the scanning module 424 to scan pages of virtual memory 434 that were marked as modified or executed through for any virus signatures. The emulation module 426 preferably detects a metamorphic virus via stochastic information obtained during emulation, such as instruction usage profiles. If a virus is found 534 by the emulating module 426, the VDS 400 reports that the file 100 is infected. Otherwise, the VDS 400 reports 538 that it did not detect a virus in the file 100.

In sum, the VDS 400 according to the present invention uses P-code and primitives 420 to extend the possible behaviors of the VDS. The P-code also allows the VDS 400 to be updated to detect new viruses without costly engine upgrades. In addition, the behavior of the VDS 400 is adapted to examine files having multiple entry points in a reasonable amount of time.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A virus detection system for detecting if a computer file is infected by a virus, the file having a plurality of potential virus entry points, the system comprising:
    a non-transitory computer-readable storage medium storing executable computer program modules comprising:
        an engine module adapted to examine the plurality of potential virus entry points and post for emulating ones of the plurality of potential virus entry points exhibiting characteristics indicating a possible virus infection, to post for scanning regions of the file exhibiting characteristics indicating a possible virus infection, and to merge overlapping regions posted for scanning;
        an emulating module for emulating the posted entry points of the file in a memory, wherein a virus signature becomes apparent during the emulation of an entry point if the file is infected by the virus; and
        a scanning module for scanning the memory and the posted regions of the file for virus signatures.

2. The virus detection system of claim 1, the medium further comprising:
    a custom module coupled to the engine module for executing custom virus-detection code responsive to invocation by the engine module.

3. The virus detection system of claim 1, wherein the engine module is further adapted to execute instructions stored in an intermediate language and the engine module further comprises:
    an interpreter for interpreting the intermediate language and controlling the operation of the virus detection system responsive thereto.

4. The virus detection system of claim 1, the medium further comprising:
    a virus definition module adapted to hold a plurality of virus signatures for which the scanning module can scan.

5. The virus detection system of claim 1, wherein the engine module is adapted to post a subset of the plurality of potential virus entry points for emulating.

6. A method for detecting a virus in a computer file, the method comprising:
    using a computer to perform steps comprising:
        examining regions of the file for possible infection by viruses and posting for scanning any regions exhibiting characteristics indicating a possible virus infection;
        merging overlapping regions posted for scanning;
        examining a plurality of potential virus entry points of the file for possible infections by viruses and posting for emulating ones of the plurality of potential virus entry points exhibiting characteristics indicating a possible virus infection; and
        examining the posted regions of the file to determine whether the file is infected with the virus.

7. The method of claim 6, further comprising:
scanning the merged regions of the file posted for scanning for signatures of viruses.

8. The method of claim 6, further comprising:
emulating the posted entry points in a memory to allow the virus to become apparent; and
scanning the memory for a signature of the virus.

9. The method of claim 6, further comprising:
emulating the posted entry points in a memory to allow the virus to become apparent; and
examining stochastic information obtained during emulation to detect the presence of the virus.

10. The method of claim 6, wherein the step of examining a plurality of potential virus entry points of the file for possible infections by viruses and posting for emulating ones of the plurality of potential virus entry points exhibiting characteristics indicating a possible virus infection comprises:
determining if a main entry point of the file has known non-viral code;
wherein the main entry point is posted for emulating responsive to a determination that the main entry point does not have known non-viral code.

11. The method of claim 6, wherein a subset of the plurality of potential virus entry points are posted for emulating.

12. A computer program product comprising:
a non-transitory computer-readable storage medium storing executable computer code for determining if a computer file is infected by a virus, the file having a plurality of potential virus entry points, the computer code comprising:
an engine module adapted to examine the plurality of potential virus entry points and post for emulating ones of the plurality of potential virus entry points exhibiting characteristics indicating a possible virus infection, to post for scanning regions of the file exhibiting characteristics indicating a possible virus infection, and to merge overlapping regions posting for scanning;
an emulating module for emulating the posted entry points of the file in a memory, wherein a virus signature becomes apparent during emulation of an entry point if the file is infected by the virus; and
a scanning module for scanning the memory and the posted regions of the file for virus signatures.

13. The computer program product of claim 12, wherein the engine module is further adapted to execute instructions stored in an intermediate language and the engine module comprises:
an interpreter for interpreting the intermediate language and controlling the operation of the engine module responsive thereto.

14. The computer program product of claim 12, further comprising:
a virus definition module adapted to hold a plurality of virus signatures for which the scanning module can scan.

15. The computer program product of claim 12, wherein the engine module is adapted to post a subset of the plurality of potential virus entry points for emulating.

\* \* \* \* \*